United States Patent
Pratt

(10) Patent No.: US 9,785,771 B1
(45) Date of Patent: Oct. 10, 2017

(54) PREVENTING MALICIOUS ATTACKS LAUNCHED FROM OR INVOLVING USB DEVICES

(71) Applicant: Bromium, Inc., Cupertino, CA (US)

(72) Inventor: Ian Pratt, Cambridge (GB)

(73) Assignee: Bromium, Inc., Cupertino, CA (US)

( * ) Notice: Subject to any disclaimer, the term of this patent is extended or adjusted under 35 U.S.C. 154(b) by 191 days.

(21) Appl. No.: 14/798,239

(22) Filed: Jul. 13, 2015

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/55* | (2013.01) |
| *G06F 13/42* | (2006.01) |

(52) U.S. Cl.
CPC ........ *G06F 21/554* (2013.01); *G06F 13/4282* (2013.01); *G06F 2221/034* (2013.01)

(58) Field of Classification Search
CPC ............. H04L 63/1416; H04L 63/1425; H04L 63/145; G06F 21/554; G06F 21/552
USPC .......................................................... 726/23
See application file for complete search history.

(56) References Cited

U.S. PATENT DOCUMENTS

2013/0014221 A1* 1/2013 Moore ................... G06F 21/85
726/3

OTHER PUBLICATIONS

ACM DL Digital Library, "Preventing Malicious Attacks Launched From or Involving USB Devices", The ACM Full-Text Collection, printed Mar. 8, 2017, 5 pages.

* cited by examiner

*Primary Examiner* — Kambiz Zand
*Assistant Examiner* — Stephen Sanders
(74) *Attorney, Agent, or Firm* — Brokaw Patent Law PC; Christopher J. Brokaw

(57) ABSTRACT

Approaches for protecting a computing device against malicious code using an attack vector involving a USB device. A computing device prevents a USB device from communicating operational input to the computing device using a USB port residing on or coupled to the computing device unless consent data is stored on the computing device. Consent data is data that affirms consent provided by a user of the computing device to allow the USB device to communicate with the computing device using the USB port. Note that the lack of consent data stored on the computing device does not prohibit the USB device from identifying itself to the computing device. In this way, if the USB device comprises malicious code or has been designed in a malicious manner, the USB device will be unable to submit operational input to the computing device without the consent of the user.

22 Claims, 3 Drawing Sheets

COMPUTING DEVICE 120 PREVENTS USB DEVICE 110 FROM COMMUNICATING OPERATIONAL INPUT TO COMPUTING DEVICE 120 USING A USB PORT 122 UNLESS CONSENT DATA 130 IS STORED ON COMPUTING DEVICE 120 ⟶ 210

PREVENTING MALICIOUS ATTACKS LAUNCHED FROM OR INVOLVING USB DEVICES

FIELD OF THE INVENTION

Embodiments of the invention relate to preventing malicious attacks involving a USB device.

BACKGROUND

The protection of the privacy and integrity of the data and resources of a computer is a well-recognized need. However, the best way to protect a computer's data and resources against attacks and intrusion has been the subject of much discussion, debate, and development of the years.

An early approach for securing a computer against the potential dangers of the Internet, which came to prominence in the public eye around 1990, involved the use of a firewall. Early firewalls were software applications which were positioned in the flow of network traffic between a computer and a public network, such as the Internet. The firewall prevented the exchange of certain types of network traffic to any computer behind the firewall. Initially, firewalls were configured to only allow email or SMTP network traffic to be exchanged with devices behind the firewall. Over time, it became desirable for additional types of network traffic to be allowed through the firewall; as such, it became commonplace for firewalls to permit additional types of network traffic (such as FTP and WWW traffic) through the firewall. Firewalls have evolved from consisting of a pure software implementation to being implemented, by certain vendors, as specialized hardware appliances.

As computers became more popular in the home and the workplace, malware began to spread to computers not just through a public network but also through the sharing of portable storage mediums, such as floppy disks. Malware which resides on portable storage mediums could infect a computer not connected to a public network. To combat this new attack vector, antivirus software was developed. Antivirus software is software that analyzes the files of a computer-readable medium to identify any files which have been previously identified as being malicious. Once malicious files have been identified, the antivirus software quarantines and removes the malicious files.

Firewalls and antivirus software currently form the foundation of modern computer security paradigms. Virtually all computer security approaches are enhancements to one or both of the firewall and antivirus software. For example, firewalls have been embellished to look deeper into network traffic to examine the contents of a data packet in determining whether to permit or deny the data packet passage through the firewall. The firewall may be configured to allow certain types of network traffic deemed permissible by a policy (such as work-related HTTP network traffic) but prevent other types of network traffic deemed impermissible by a policy (such as non-work related HTTP network traffic). Other firewalls may allow certain network traffic to pass through the firewall, but will subsequently check each network communication for malware; upon detecting that a network communication (such as an email) which has already past the firewall did contain malware, the firewall alerts the destination of that network communication that it may already have been compromised.

Antivirus software has also been embellished to rely more on the behavior of an executable file rather than considering the file's signature in determining whether the file is malicious. Unfortunately, the current paradigm for protecting the data and resources of a computer using combinations of firewalls and antivirus software has been demonstrated to be ineffectual.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for protecting a computing device against malicious code using an attack vector involving a USB device are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Malware may be spread to a computer through the use of a USB device. A USB device, as broadly used herein, refers to any device which is designed to be physically inserted into a USB port in the performance of at least a portion of its intended function. Several non-limiting examples of a USB device include a memory stick, a mass storage device, a keyboard, a video camera, and a mouse, to name but a few examples. Many different types of USB devices exist. For example, certain types of USB devices are human interface devices (HID) which allow a user to submit operational input (such as keystrokes or mouse movements for example) to another computer. Another category of USB devices is a mass storage device, such as a flash drive, a portable CD-ROM, and the like. A USB device may be associated with one or more different types of USB devices.

Figure 1A:
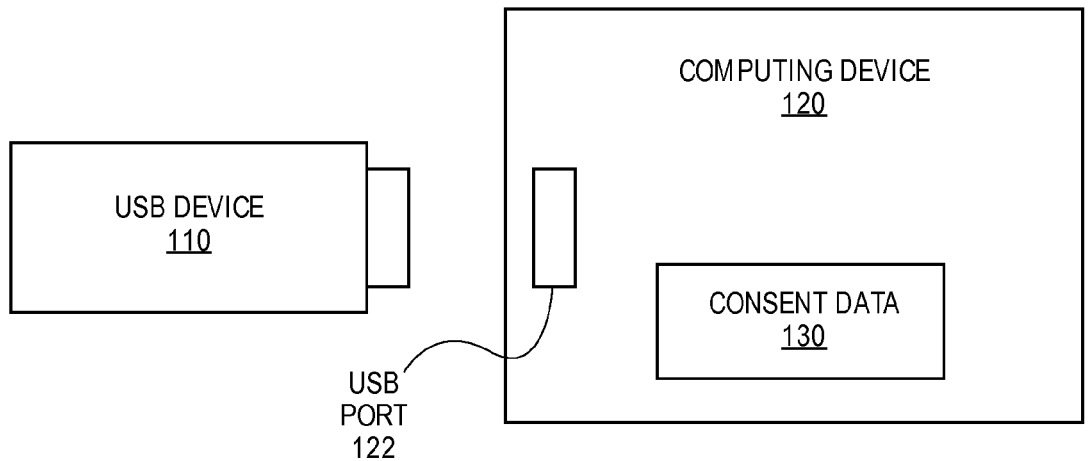
FIGS. 1A, 1B, and 1C are block diagrams of a USB device coupled to a computing device via a USB port according to different embodiment of the invention.
Figure 1B:
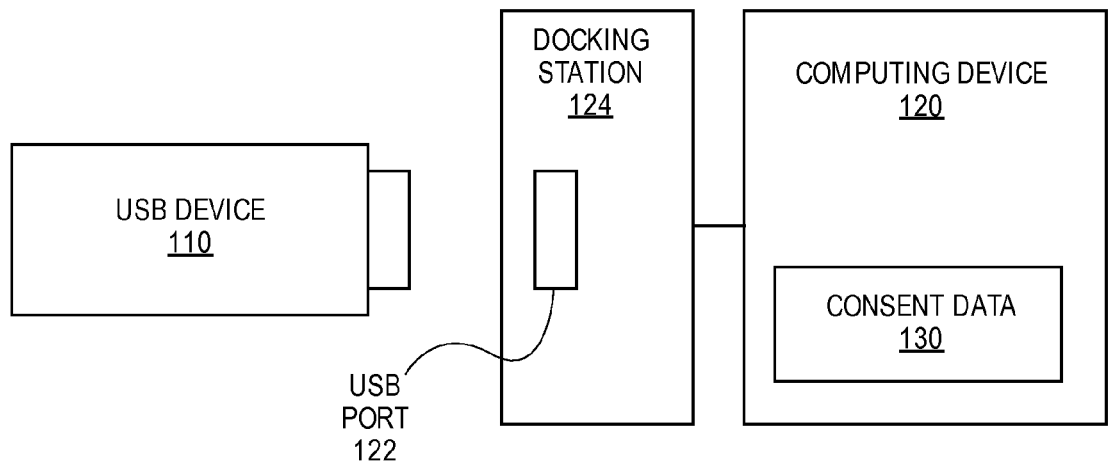

For purposes of providing a clear explanation, the computer to which a USB device communicates via a USB port is referred to herein as a computing device. There are several ways in which a USB device may be coupled to a computing device, as shown in FIGS. 1A and 1B, which are block diagrams of USB device 110 coupled to computing device 120 via USB port 122 according to different embodiment of the invention In FIG. 1A, USB port 122 is a USB port that physically resides on computing device 120. Thus, in FIG. 1A, USB device 110 is physically connected to computing device 120 via USB port 122. However, USB port 122 need not always reside on computing device 120. For example, in the embodiment shown in FIG. 1B, USB port 122 resides on docking station 124 rather than on computing device 120. Computing device 120 may be occasionally physically connected to docking station 124. When computing device 120 happens to be physically connected to docking station 124, if USB device 110 were to be physically inserted into USB port 122 residing on docking station 124, then USB device 110 and computing device 120 may communicate with each other via USB port 122. While only a single USB port is depicted in FIGS. 1A and 1B, those in art shall appreciate that computing device 120 and docking station 124 may comprise any number of USB ports.

Figures 1C, 2:
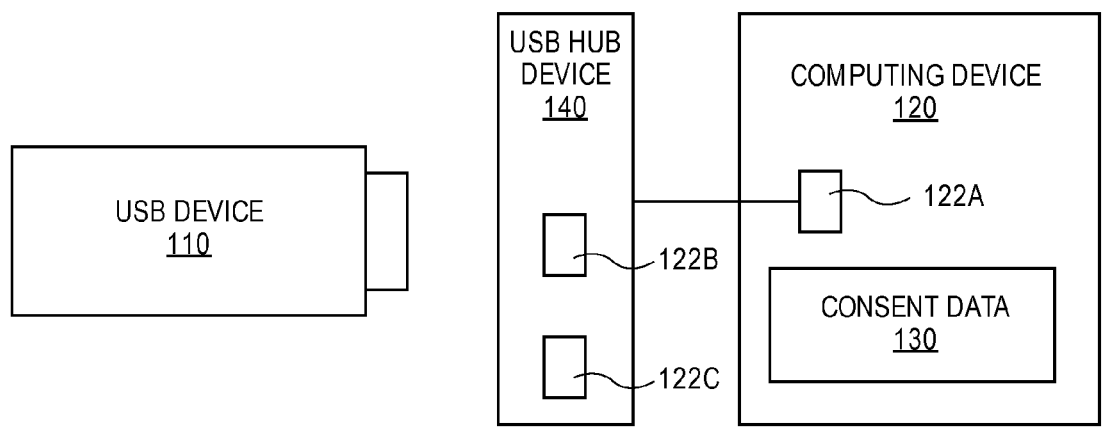
FIG. 2 is a flowchart of the process for protecting a computing device against malicious code residing on a USB device according to one embodiment of the invention.

FIG. 1C depicts another embodiment of the invention involving the use of USB hub device 140. USB hub device 140 is any device which may be plugged into a USB port and itself comprises one or more other USB ports. To illustrate, as shown in FIG. 1C, USB hub device 140 is plugged into USB port 122A of computing device 120. USB hub device 140 is depicted in FIG. 1C as having two USB ports, namely USB ports 122B and 122C. In reality, USB hub devices may have any number of USB ports, including one USB port or three or more USB ports. If USB device 110 is plugged into one of USB port 122B or 122C while USB hub device 140 is plugging into USB port 122A, then USB device 110 will be operatively connected to computing device 120, and USB device 110 and computing device 120 may communicate with each other. As well as being a separate physical box, the USB hub component may be included internally inside the computer, or within some other USB device.

Unbeknownst to a user, USB device 110 may store malicious code or be designed to operate in a malicious manner. For example, USB device 110 may contain malicious code or files, which when executed or interpreted by computing device 120, cause malicious actions to occur. As another example, the firmware of USB device 110 may be compromised or be created to operate in a malicious manner.

When USB device 110 is inserted into USB port 122, USB device 110 and computing device 120 exchange communications designed to identify at least one device type of USB device 110 to computing device 120. USB device 110 may be a "composite device," which is a USB device that identifies itself as two or more device types. For example, it is common for cellular modem devices to identify themselves as both a network interface device and a mass storage device (the latter being used for convenience to store the drivers for the device).

During this exchange of communications, USB device 110 is unable to uniquely identify itself to computing device 120, but USB device 110 does identify what type of USB device it is to computing device 120. In other words, the USB protocol does not allow computing device 120 to identify one keyboard from another, but computing device 120 can tell that a particular USB device is a keyboard.

If USB device 110 is compromised in a malicious manner, USB device 110 may initially present itself to computing device 120 as one type of USB device (such as a mass storage device), but may later act as a different type of USB device (such as a human interface device (HID) that submits operational input (such as keystrokes) to computing device 120). If USB device 110 is allowed unfettered access to computing device 120 via USB port 122, USB device 110 may submit operational input that causes malicious actions to be performed on computing device 120. To illustrate but one example, USB device 110 could be designed to send keystrokes to computing device 120. These keystrokes might cause a command shell to be brought up, quickly minimized so the user cannot see what is occurring, and various commands may be entered into the command shell to compromise computing device 120. Allowing USB device 110 to submit keystrokes or other types of operational input exposes computing device 120 to a number of different attack vectors. Thus, a mass storage device that also identifies itself as a human interface device (HID) device is suspicious.

One way one combat this type of attack is to display a dialogue box or other visual indicator to the user each time a USB device has been inserted into USB port 122 that presents itself as a human interface device (HID). If the user does not believe that the USB device should be recognized as a human interface device (HID) (i.e., capable of submitting operational input), then the user could choose to prevent the USB device from being allowed to connect to computing device 120, e.g., the user may select a "cancel" option on the displayed dialogue box to prevent USB device from connecting to computing device 120.

Addressing this type of attack vector from a USB device in this manner can lead to user frustration and annoyance because the user is required to approve or deny access to each USB device every time a USB device is connected to computing device 120. For example, each and every time computing device 120 is connected to docking station 124, the user would be required to grant access to docking station 124. Similarly, each and every time a human interface device (HID) that the user wishes to use is inserted into USB port 122, the user must perform an express action to grant access to that HID, even if that HID has been used by the user for some time and is not considered a threat.

Advantageously, embodiments of the invention enable computing device 120 to be protected against malicious attacks originating from USB device 110 in a manner that minimizes user frustration and annoyance. In an embodiment, computing device 120 prevents USB device 110 from communicating operational input to computing device 120 using USB port 122 residing on or coupled to computing device 120 unless consent data 130 is stored on computing device 120. Consent data 130 is data that affirms consent provided by a user of computing device 120 to allow USB device 110 to communicate with computing device 120 using USB port 122. Note that the lack of consent data 130 stored on computing device 120 does not prohibit USB device 110 from identifying itself to computing device 120. In this way, if USB device 110 comprises malicious code or has been designed in a malicious manner, USB device 110 will be unable to submit operational input to computing device 120 without the consent of the user.

Protection Against Attacks Originating from a USB Device

Embodiments of the invention operate, in part, under the recognition that while you cannot use the USB protocol to uniquely identify one USB device from another USB device, you can identify the port number associated with the USB port into which a particular USB device is inserted. Based on this recognition, embodiments of the invention manage the risk associated with malicious attacks originating from a USB device, at least in part, by using knowledge of the port number associated with the USB port to which the USB device is connected.

FIG. 2 is a flowchart of the process for protecting a computing device against malicious code residing on a USB device according to one embodiment of the invention. As shown in step 210, computing device 120 prevents USB device 110 from communicating operational input to computing device 120 using USB port 122 unless consent data 130 is stored on computing device 120. As broadly used herein, consent data 130 is data that affirms consent of the user of computing device 120 to allow USB device 110 to communicate with computing device 120 using USB port 122.

Consent data 130 for a particular USB port 122 may be obtained in a variety of different ways. In an embodiment, the first time any USB device is physically connected to USB port 122, computing device 120 may cause a user interface to be displayed. The user interface informs the user that the user has not previously consented for a USB device to communicate with computing device 120 using USB port 122. The user interface may provide a mechanism to allow the user to grant consent for the USB device to communicate with computing device 120 using USB port 122. In certain embodiments, the user may grant access to certain types of USB devices (such as mass storage devices) to use USB port 122 but may deny access to other types of USB devices (such as human interface devices) to use USB port 122. After the user has either granted or denied access to USB devices, or a type of USB device, with respect to USB port 122, the user will generally not be prompted again any subsequent time a USB device to which the user has consented is connected to USB port 122.

Embodiments of the invention may be used to prevent certain types of USB devices which typically do not issue operational input (such as keystrokes) from, unknowingly to the user, submitting such operational input. This is so because such operational input would in all likelihood be designed to cause malicious activity. However, the user may consent, without being prompted to confirm continued consent upon repeated use of the USB device, to allow USB devices, or certain types of USB devices such as a mass storage device, to use certain USB ports. Certain activity of a USB device may also signal that the USB device is compromised, and as a consequence, result in the USB device from being disconnected to prevent further use and potential performance of malicious activity.

Embodiments of the invention may be used with USB ports that reside in a docking station, such as the embodiment depicted in FIG. 1B. If computing device 120 detects that USB device 110 has been physically connected to USB port 122 on docking station 124 (as shown in FIG. 1B), computing device 120 may permit USB device 110 to submit operational input to computing device 120 using USB port 122, without notifying the user, after computing device 120 verifies that computing device 120 stores a set of consent data 130 that indicates that the user has previously consented to computing device 120 using USB port 122 on docking station 124.

Embodiments of the invention may also be used in conjunction with USB hub device. For example, with reference to FIG. 1C, upon computing device 120 detecting that USB device 110 has been physically connected to USB port 122B on USB hub device 140 while USB hub device 140 is physically connected to USB port 122A, computing device 120 may permit USB device 110 to communicate with computing device 120, without notifying the user, only after verifying that computing device 120 stores a set of consent data 130 that indicates that the user has previously consented to computing device 120 using a particular port number of USB port 122B.

According to one embodiment, the user may configure consent data 130 such that the user is not warned about future connections made at a particular USB port. To illustrate, upon computing device 120 detecting that USB device 110 has been physically connected to USB port 122, computing device 120 permits USB device 110 to submit operational input to computing device 120, without notifying the user, after verifying that computing device 120 stores a set of consent data that indicates that the user has previously consented to computing device 120 using a particular port number of USB port 122.

In some instances, certain types of operational input received from USB device 110 might arose suspicions that USB device 110 is behaving maliciously. For example, USB device 110 might correspond to a device designed to advance a slide presentation. Typically, such devices only allow the slide presentation to go forward or backward one slide. For this reason, most devices of this nature have a very restrictive set of operational inputs which they can submit to computing device 120 (such as a forward arrow to advance to the next slide and a backward arrow to display the prior slide), as these types of USB devices typically lack a full keyboard. If a USB device designed to advance a slide presentation submitted alphanumeric operational input, or operational input beyond that allowed or expected for a slide presentation device (such as a Windows key+the R key), the slide presentation device may be considered by computing device 120 to be acting in a malicious manner.

To combat this type of attack, in an embodiment, upon computing device 120 detecting that USB device 110 has been physically connected to USB port 122, computing device determining one or more device types for USB device 110. For example, computing device 120 may determine that USB device 110 is a slide presentation device designed to control the display of a slide presentation. Computing device 120 may permit USB device 120 to submit operational input to computing device 120 so long as USB device submits operational input in a set of allowable operational input for the determined device type of USB device 120. In an embodiment, the set of allowable operational input may be identified for the device type in consent data 130. When a user provides or specifies consent data 130, the user could, although need not, specify the set of allowable operational input for a device type at USB port 122 at that time. Alternately, each type of USB device may be associated with a set of allowable operational input.

When computing device 120 determines that USB device 110 has submitted operational input over USB port 122 to computing device 120 which is not in the set of allowable operational input for the device type(s) of USB device 110 at that USB port 122, computing device 120 may notify the user and/or perform one or more other security measures, such as preventing USB device 120 from communicating with computing device 120 over port 122.

Certain embodiments may continuously analyze the behavior of USB device 110 in determining whether to permit USB device 110 to continue to communicate with computing device 120 over USB port 122. When computing device 120 determines that USB device 110 is presently exhibiting suspicious behavior, computing device 120 may cease to allow USB device 110 to exchange communications with computing device 120 over USB port 122.

There are several different types of suspicious behavior which USB device 110 can exhibit which could prompt computing device 120 to cease to allow USB device 110 to exchange communications with computing device 120 over USB port 122. For example, if USB device 110 initially identifies itself to computing device 120 as a multi-function device or initially identifies itself to computing device 120 as both a mass-storage device and a human interface device (HID), such as a keyboard, then there is a risk that USB device 110 might be designed so that the user of USB device 110 believes he or she is using a storage device or some other benign or safe device, but nevertheless USB device 110 is designed to issue operational input (such as keystrokes) to computing device 120 for malicious purposes. Embodiments might also consider any device that behaves as both a HID and a mass storage device as suspicious. It would be suspicious to receive operational input, such as mouse movements or keystrokes, from a mass storage device, and so if such operational input is received from a USB device that claims to not be a HID, then embodiments would consider this suspicious activity and perform one or more security measures against the USB device, such as ceasing to allow USB device 110 to exchange communications with computing device 120 over USB port 122.

As another example, embodiments may consider it suspicious behavior if USB device 110 issued keystroke commands to computing device 120 faster than a predetermined rate. For example, the predetermined rate may correspond to or be based upon the upper bound of how fast a human operator can type on a keyboard. It would be advantageous to spread malicious code as fast as possible, and so if keystrokes are submitted from USB device 110 to computing device 120 faster than a human operator could typically type, then this is highly suggestive that USB device 110 may be behaving in a malicious manner. In response to detecting this type of suspicious activity, embodiments may perform one or more security measures against the USB device, such as ceasing to allow USB device 110 to exchange communications with computing device 120.

As another example, embodiments may consider it suspicious behavior if USB device 110 issues operational input, such as a sequence of keystroke commands, which match a signature that has been predetermined to be malicious. Alternately, embodiments may consider it suspicious behavior if USB device 110 issues a sequence of input or strings which are known to be indicative of a malicious attack or a cause of alarm. In response to detecting this type of suspicious activity, embodiments may perform one or more security measures against the USB device, such as ceasing to allow USB device 110 to exchange communications with computing device 120.

It is noted that while it is generally not possible to uniquely identify a given keyboard device, as the device firmware serial numbers and manufacture/model strings which may be communicated when such keyboard devices are connected are often not present and may be easily be changed/forged, in certain embodiments this information may be a factor in when deciding whether computing device 120 has previously encountered a particular device active on a particular USB port and/or the user has consented to the use of the keyboard device at that particular USB port.

Protecting Against Different Types of Attack Vectors

Certain types of attack vectors may rely upon computing device 120 automatically rendering a thumbnail or traversing a link stored on USB device 120. For example, when a mass storage device is plugged into USB port 122, certain utilities or drivers may attempt to automatically read or parse the contents of the files stored on USB device 110. In doing so, computing device 120 may expose itself to certain types of attack vectors designed to use this behavior to cause malicious code to be introduced into computing device 120 when USB device 110 is plugged into USB port 122. Indeed, the bit pattern of a file stored on USB device 110 may be designed such that, when it is read by the driver executing on computing device 120 which parses the contents of USB device 110, a bug is triggered which is then exploited by malicious code on USB device 110.

Embodiments of the invention may use a type of virtual environment, referred to herein as a service virtual environment, to combat against such types of attack vectors. Upon inserting USB device 110 into USB port 122, computing device 120 may automatically instantiate a service virtual environment. The service virtual machine may be implemented by any type of isolated virtual environment, such as a virtual machine, that comprises a driver stack for USB device 110. The driver stack might include, for example, a mass storage driver and a file system driver.

In an embodiment, the hardware may support the virtualization of the host controller. In such an approach, access to a subset of the host controller functionality associated with communicating with USB device 110 may be obtained from the service virtual environment. In this type of embodiment, the USB host controller device driver executes within the service virtual environment.

The service virtual environment may expose an interface to a host operating system executing on computing device 120. This interface allows the host operating system to view files stored on USB device 110 and prevents the host operating system executing on computing device 120 from viewing data blocks stored on USB device 110. Computing device 120 may route all communications received from USB device 110 to this service virtual environment for processing. In an embodiment, the interface may be implemented such that the service virtual environment might be interpreted by a host operating system executing on computing device 120 as a network shared folder or media transfer protocol device.

The interface exposed by the service virtual environment prevents certain types of files stored on USB device 110 from being viewed, accessed, or visible to the host operating system of computing device 120. The types of files which may not be viewed, accessed, or visible to the host operating system include one or more of: thumbnail files, icon files, and LNK files. Consequently, attack vectors that rely upon utilities or drivers in computing device 120 automatically reading or parsing the contents of the files stored on USB device 110 will not be successful in compromising the privacy or integrity of computing device 120.

Certain types of malicious code may be designed to intercept and record key strokes made by a user. This type of malicious code is often referred to as a key logger, although any type of operational input may be intercepted, recorded, and used for nefarious purposes. Such key logger code may be designed to steal a user's username and password or perform industrial espionage. A key logger might reside on a USB hub device, such as USB hub device 140. In an embodiment, a computing device 120 may detect that USB device 110 has been physically moved from a first USB port (such as port 122A), for which consent data 130 has been recorded, to a second USB port (such as port 122B), for which consent data 130 has not been recorded. The second USB port may be on USB hub device 140, for example. When this happens, in an embodiment, to protect the user from key logger software which may reside on USB hub device 140, computing device 120 prevents the user from using USB device 110 and may electronically inform an administrator of USB device 110 (for example, by email, instant message, or the like) that USB device 110 has been physically moved to an unapproved USB port (i.e., an USB port for which consent data 130 has not been stored).

Hardware Mechanisms

Figure 3:
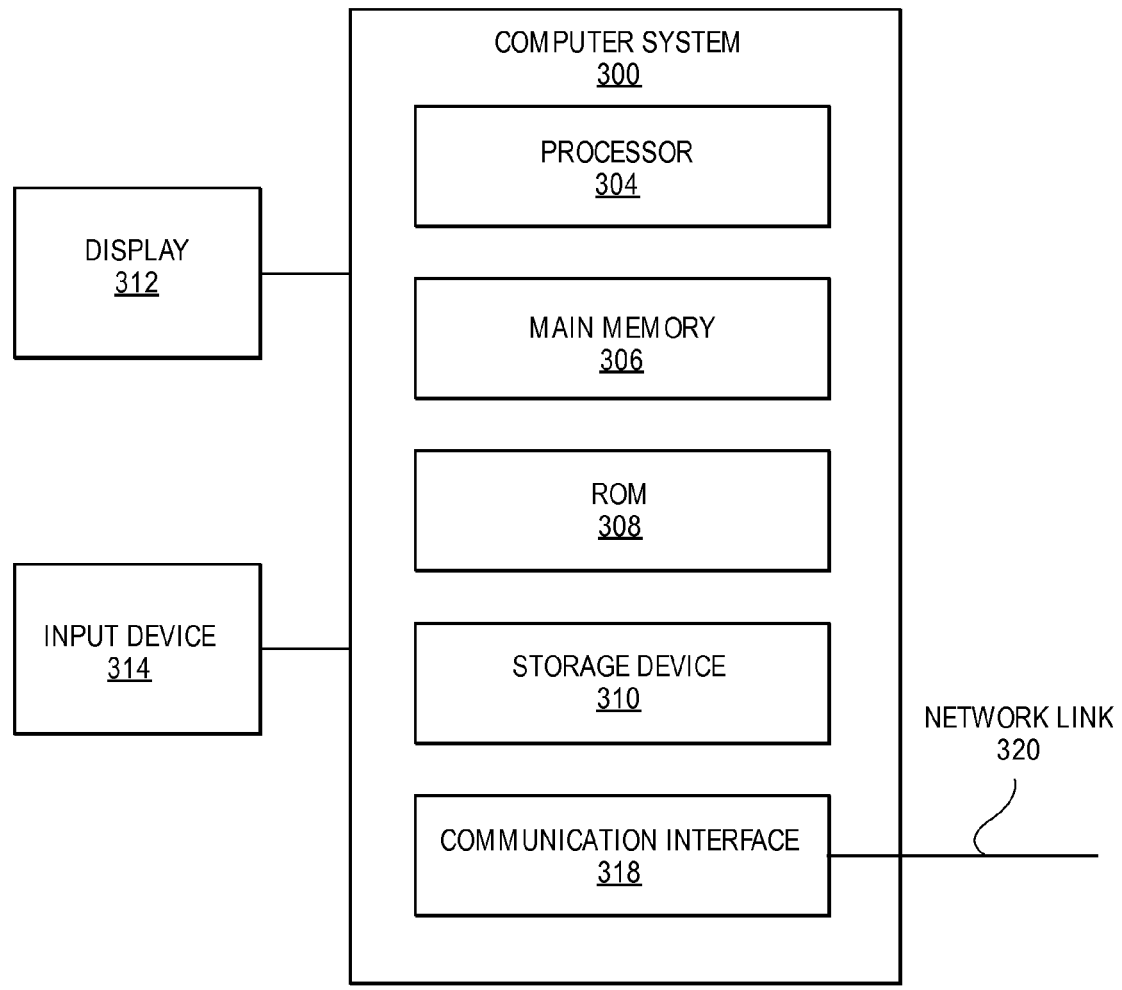
FIG. 3 is a block diagram that illustrates the hardware components of a computer system upon which an embodiment of the invention may be implemented

In an embodiment, computing device 120 may be implemented on, or correspond to, a computer system. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for protecting a computing device against malicious code using an attack vector involving a USB device, which when executed by one or more processors, cause:

said computing device preventing a USB device from communicating operational input to said computing device using a particular USB port residing on or coupled to said computing device unless consent data is stored on said computing device for that particular USB port, wherein said consent data is data that affirms consent provided by a user of said computing device to allow said USB device to communicate with said computing device using one or more specifically identified USB ports, and wherein said computing device requires consent data to be provided by said user for each separate USB port of said computing device for the computing device to allow said USB to communicate with said computing device using the separate USB port of said computing device.

2. The one or more non-transitory machine-readable storage mediums of claim 1, wherein a lack of consent data stored on said computing device does not prohibit said USB device from identifying itself to said computing device.

3. The one or more non-transitory machine-readable storage mediums of claim 1, wherein execution of the one or more sequences of instructions further cause:
upon said computing device detecting that said USB device has been physically connected to said particular USB port, the computing device causing a user interface to be displayed that enables said user to provide their consent for said computing device to communicate with said USB device using said particular USB port.

4. The one or more non-transitory machine-readable storage mediums of claim 1, wherein said particular USB port is physically located on a docking station, and wherein execution of the one or more sequences of instructions further cause:
upon the computing device detecting that said USB device has been physically connected to said particular USB port, the computing device permitting the USB device to submit operational input to said computing device using said particular USB port, without notifying the user, after verifying that said computing device stores a set of consent data that indicates that the user has previously consented to said computing device using said particular USB port on said docking station.

5. The one or more non-transitory machine-readable storage mediums of claim 1, wherein execution of the one or more sequences of instructions further cause:
upon the computing device detecting that said USB device has been physically connected to said particular USB port, the computing device permitting the USB device to communicate with said computing device, without notifying the user, after verifying that said computing device stores a set of consent data that indicates that the user has previously consented to said computing device using a particular port number of said particular USB port.

6. The one or more non-transitory machine-readable storage mediums of claim 1, wherein said particular USB port is a first USB port, and wherein execution of the one or more sequences of instructions further cause:
said computing device detecting that said USB device has been physically moved from said first USB port to a second USB port, wherein a USB hub device is in a communication path between said USB device and said computing device; and
in response to said computing device detecting that said USB device has been physically moved to said second USB port, said computing device preventing a user from using said USB device and informing an administrator of said USB device that said USB device has been physically moved to said second USB port.

7. The one or more non-transitory machine-readable storage mediums of claim 1, wherein execution of the one or more sequences of instructions further cause:
upon the computing device detecting that said USB device has been physically connected to said particular USB port, the computing device determining at least one device type for said USB device;
permitting the USB device to communicate with said computing device by submitting operational input in a set of allowable operational input for said device type, wherein said set of allowable operational input is identified for said device type by a set of consent data stored on said computing device; and
said computing device notifying said user upon said computing device determining that said USB device has submitted operational input over said particular USB port to said computing device which is not in said set of allowable operational input.

8. One or more non-transitory machine-readable storage mediums storing one or more sequences of instructions for protecting a computing device from malicious code using an attack vector involving a USB device, which when executed by one or more processors, causes:
upon inserting said USB device into a USB port residing on or coupled to said computing device, said computing device automatically instantiating a virtual environment comprising a driver stack for said USB device;
said virtual environment exposing an interface to a host operating system executing on said computing device, wherein said interface allows the host operating system to access files stored on said USB device and prevents the host operating system from directly accessing data blocks stored on said USB device; and
said computing device routing all communications received from said USB device to said virtual environment for processing.

9. The one or more non-transitory machine-readable storage mediums of claim 8, wherein said host operating system interprets said virtual environment as a network shared folder or media transfer protocol device.

10. The one or more non-transitory machine-readable storage mediums of claim 8, wherein said interface prevents certain types of files stored on said USB device from being viewed, accessed, or visible to said host operating system, wherein said certain types of files include one or more of: thumbnail files, icon files, and LNK files.

11. The one or more non-transitory machine-readable storage mediums of claim 8, wherein a USB host controller device driver executes within said virtual environment, wherein said virtual environment has access to a physical USB controller hardware.

12. A computing device protecting against malicious code using an attack vector involving a USB device, comprising:
one or more processors; and
one or more non-transitory computer readable storage mediums storing one or more sequences of instructions, which when executed, cause:
said computing device preventing a USB device from communicating operational input to said computing device using a particular USB port residing on or coupled to said computing device unless consent data is stored on said computing device for that particular USB port,
wherein said consent data is data that affirms consent provided by a user of said computing device to allow said USB device to communicate with said computing device using one or more specifically identified USB ports, and
wherein said computing device requires consent data to be provided by said user for each separate USB port of said computing device for the computing device to allow said USB to communicate with said computing device using the separate USB port of said computing device.

13. The computing device of claim 12, wherein a lack of consent data stored on said computing device does not prohibit said USB device from identifying itself to said computing device.

14. The computing device of claim 12, wherein execution of the one or more sequences of instructions further cause:
upon said computing device detecting that said USB device has been physically connected to said particular USB port, the computing device causing a user interface to be displayed that enables said user to provide their consent for said computing device to communicate with said USB device using said particular USB port.

15. The computing device of claim 12, wherein said particular USB port is physically located on a docking station, and wherein execution of the one or more sequences of instructions further cause:
upon the computing device detecting that said USB device has been physically connected to said particular USB port, the computing device permitting the USB device to submit operational input to said computing device using said particular USB port, without notifying the user, after verifying that said computing device stores a set of consent data that indicates that the user has previously consented to said computing device using said particular USB port on said docking station.

16. The computing device of claim 12, wherein execution of the one or more sequences of instructions further cause:
upon the computing device detecting that said USB device has been physically connected to said particular USB port, the computing device permitting the USB device to communicate with said computing device, without notifying the user, after verifying that said computing device stores a set of consent data that indicates that the user has previously consented to said computing device using a particular port number of said particular USB port.

17. The computing device of claim 12, wherein said particular USB port is a first USB port, and wherein execution of the one or more sequences of instructions further cause:
said computing device detecting that said USB device has been physically moved from said first USB port to a second USB port, wherein a USB hub device is in a communication path between said USB device and said computing device; and
in response to said computing device detecting that said USB device has been physically moved to said second USB port, said computing device preventing a user from using said USB device and informing an administrator of said USB device that said USB device has been physically moved to said second USB port.

18. The computing device of claim 12, wherein execution of the one or more sequences of instructions further cause:
upon the computing device detecting that said USB device has been physically connected to said particular USB port, the computing device determining at least one device type for said USB device;
permitting the USB device to communicate with said computing device by submitting operational input in a set of allowable operational input for said device type, wherein said set of allowable operational input is identified for said device type by a set of consent data stored on said computing device; and
said computing device notifying said user upon said computing device determining that said USB device has submitted operational input over said particular USB port to said computing device which is not in said set of allowable operational input.

19. A computing device protecting against malicious code using an attack vector involving a USB device, comprising:
one or more processors; and
one or more non-transitory computer readable storage mediums storing one or more sequences of instructions, which when executed, cause:
upon inserting said USB device into a USB port residing on or coupled to said computing device, said computing device automatically instantiating a virtual environment comprising a driver stack for said USB device;
said virtual environment exposing an interface to a host operating system executing on said computing device,
wherein said interface allows the host operating system to access files stored on said USB device and prevents the host operating system from directly accessing data blocks stored on said USB device; and
said computing device routing all communications received from said USB device to said virtual environment for processing.

20. The computing device of claim 19, wherein said host operating system interprets said virtual environment as a network shared folder or media transfer protocol device.

21. The computing device of claim 19, wherein said interface prevents certain types of files stored on said USB device from being viewed, accessed, or visible to said host operating system,
wherein said certain types of files include one or more of: thumbnail files, icon files, and LNK files.

22. The computing device of claim 19, wherein a USB host controller device driver executes within said virtual environment, wherein said virtual environment has access to a physical USB controller hardware.

* * * * *